United States Patent
De Bougrenet De La Tocnaye et al.

(10) Patent No.: US 11,148,456 B2
(45) Date of Patent: Oct. 19, 2021

(54) ASSEMBLY CONSISTING OF A COMPLEX TRANSPARENCY DEVICE AND AT LEAST ONE ARRAY OF MICRO-IMAGES, AS WELL AS A SECURITY DOCUMENT COMPRISING SAME

(71) Applicant: OBERTHUR FIDUCIAIRE SAS, Paris (FR)

(72) Inventors: Jean-Louis De Bougrenet De La Tocnaye, Guilers (FR); Marie Dejean, Brest (FR); Vincent Nourrit, Brest (FR); Julien Gillot, Chateaugiron (FR); Xavier Borde, Osse (FR)

(73) Assignee: OBERTHUR FIDUCIAIRE SAS

( * ) Notice: Subject to any disclaimer, the term of this patent is extended or adjusted under 35 U.S.C. 154(b) by 0 days.

(21) Appl. No.: 16/772,332

(22) PCT Filed: Dec. 13, 2018

(86) PCT No.: PCT/EP2018/084669
§ 371 (c)(1),
(2) Date: Jun. 12, 2020

(87) PCT Pub. No.: WO2019/115664
PCT Pub. Date: Jun. 20, 2019

(65) Prior Publication Data
US 2021/0114398 A1 Apr. 22, 2021

(30) Foreign Application Priority Data
Dec. 14, 2017 (FR) ..................... 1762169

(51) Int. Cl.
*B42D 25/328* (2014.01)
*B42D 25/351* (2014.01)
*G02B 3/08* (2006.01)

(52) U.S. Cl.
CPC ......... *B42D 25/328* (2014.10); *B42D 25/351* (2014.10); *G02B 3/08* (2013.01)

(58) Field of Classification Search
CPC .................................................. B42D 25/328
See application file for complete search history.

(56) References Cited

U.S. PATENT DOCUMENTS

2005/0094290 A1* 5/2005 Ben-Eliezer ............. G02B 3/08
359/738
2014/0177008 A1 6/2014 Raymond et al.
(Continued)

FOREIGN PATENT DOCUMENTS

DE 102006025334 A1 12/2007
EP 2811470 A1 12/2014
(Continued)

OTHER PUBLICATIONS

International Search Report for Application No. PCT/EP2018/084669, dated Mar. 14, 2019, pp. 1-3.

*Primary Examiner* — Kyle R Grabowski
(74) *Attorney, Agent, or Firm* — Lerner, David, Littenberg, Krumholz & Mentlik, LLP (57) ABSTRACT

An assembly comprising a complex transparency device, i.e. a refractive and/or diffractive device acting on the light phase, and at least one array of micro-images, wherein: the complex transparency device comprises a periodical two-dimensional array formed from individual "pupils," wherein each pupil comprises a micro-optical device, at least some of the micro-optical devices having a non-centered optical axis, and at least some of the micro-optical devices positioned non-periodically with variable off-setting of the optical axis thereof with the array; the array of micro-images comprising as many micro-images as micro-optical devices; each micro-image has a contour identical to that of the associated pupil and a surface which is at the most identical to that of the associate pupil; and each micro-image is sub-divided into at least one thumbnail image such that when the transparency device is positioned facing the array of micro-images, and an observer observes the array through the transparency device, the observer sees, at least in a given direction of observation, an image which is reconstructed by the combination of the thumbnail images associated with the direction, wherein (Continued)

within the same subdivision, certain thumbnail images, form "firsts group" and are distributed such that when the transparency device is positioned facing the array of micro-images, the thumb-nail images are respectively arranged according to the optical axis of the associated micro-optical device.

20 Claims, 8 Drawing Sheets

(56) References Cited

U.S. PATENT DOCUMENTS

| | | | |
|---|---|---|---|
| 2014/0353959 A1* | 12/2014 | Lochbihler | B42D 25/29 283/85 |
| 2015/0213666 A1 | 7/2015 | Schiffmann et al. | |
| 2017/0225502 A1 | 8/2017 | Sauvage-Vincent | |
| 2018/0149775 A1* | 5/2018 | Power | G02B 30/00 |
| 2018/0196166 A1* | 7/2018 | Zhang | G02B 1/04 |
| 2018/0281502 A1* | 10/2018 | Zhu | B42D 25/21 |
| 2019/0061407 A1* | 2/2019 | Godfrey | B42D 25/324 |
| 2019/0176507 A1* | 6/2019 | Lister | B42D 25/29 |
| 2019/0315148 A1* | 10/2019 | Zhang | B42D 25/342 |

FOREIGN PATENT DOCUMENTS

| | | | |
|---|---|---|---|
| WO | 9740464 A2 | 10/1997 | |
| WO | 2013178349 A1 | 12/2013 | |
| WO | 2015011493 A1 | 1/2015 | |
| WO | 2015113718 A1 | 8/2015 | |
| WO | 2016141420 A1 | 9/2016 | |
| WO | 2016149760 A1 | 9/2016 | |
| WO | 2016183635 A1 | 11/2016 | |
| WO | 2017184581 A1 | 10/2017 | |
| WO | WO-2017184581 A1 * | 10/2017 | B32B 27/304 |

* cited by examiner

ASSEMBLY CONSISTING OF A COMPLEX TRANSPARENCY DEVICE AND AT LEAST ONE ARRAY OF MICRO-IMAGES, AS WELL AS A SECURITY DOCUMENT COMPRISING SAME

CROSS-REFERENCE TO RELATED APPLICATIONS

The present application is a national phase entry under 35 U.S.C § 371 of International Application No. PCT/EP2018/084669 filed Dec. 13, 2018, which claims priority from French Application No. 1762169 filed Dec. 14, 2017, all of which are hereby incorporated herein by reference.

FIELD OF THE INVENTION

The present invention relates to an assembly consisting on the one hand, of a complex transparency device, i.e. of a refractive and/or diffractive device acting on the phase of the light and, on the other hand, of at least one micro-image array.

It also relates to a security document such as a banknote which includes such an assembly.

TECHNOLOGICAL BACKGROUND OF THE INVENTION

Various techniques exist for encoding information by optical means in the field of security documents and, more particularly, fiduciary documents such as banknotes.

The holographic-type technique is the oldest one. Holograms on smart cards are still used, as described for example in document WO9740464.

Similarly, the devices exploiting the Moiré effect are currently widely used. In this regard, reference can be made to document EP2811470. They are based on a coupling between a phase array (such as micro-optical devices) and a micro-image array, of different pitches.

In addition, the techniques related to the principle of auto-stereoscopy which favor some reading angles are also very developed, as illustrated in document US2014/177008.

Variants combining the various aforementioned effects have of course been proposed, in particular in document WO2016/183635.

Other secondary techniques implementing more complex effects such as those using the polarization (see for example WO2016/141420) or resonance modes (for example with "plasmon effect") are also proposed or generally reinforce an already existing protection (see for example document WO2015/113718).

Finally, document WO 2017/184581 describes an assembly according to the preamble of claim 1 of the present application.

All these techniques, when applied to the security documents such as the fiduciary documents, aim at making their unauthorized reproduction particularly difficult, in other words at complicating the task of the counterfeiters.

The present invention, which is based on the multiscopic-type technique, aims at proposing a new variant which is even more difficult to reproduce and which includes particularly effective means for verifying the authenticity of the concerned document.

SUMMARY OF THE INVENTION

Thus, the present invention relates to an assembly consisting on the one hand, of a complex transparency device, i.e. of a refractive and/or diffractive device acting on the phase of the light and, on the other hand, of at least one micro-image array, wherein:

said complex transparency device consists of a periodic two-dimensional array formed of individual "pupils" in which each pupil includes a micro-optical device, at least part of these micro-optical devices having a non-centered optical axis, and at least part of these micro-optical devices being positioned non-periodically, i.e. with variable offsets of their optical axis within said array;

said micro-image array consists of as many micro-images as there are micro-optical devices;

each micro-image has a contour identical to that of the associated pupil and a surface at most identical to that of the associated pupil;

each micro-image is subdivided into at least one thumbnail image, so that when said transparency device is positioned facing said micro-image array, and when an observer observes said array through said transparency device, he sees, at least along a given direction of observation, an image reconstructed by the combination of the thumbnail images associated with this direction, characterized by the fact that within the same subdivision, some thumbnail images—i.e. only part of them, which constitute a "first group"—are distributed in such a way that when said transparency device is positioned facing said micro-image array, these thumbnail images are each disposed along the optical axis of said associated micro-optical device.

Furthermore, according to other non-limiting and advantageous characteristics of the invention:

each of said micro-optical devices has a non-centered optical axis and all of said micro-optical devices are positioned non-periodically;

said pupils are of identical shape and surface;

said micro-optical devices having a non-centered optical axis consist of Fresnel lenses;

said micro-optical devices having a non-centered optical axis consist of circular blazed gratings;

each micro-image is subdivided into at least two thumbnail images;

within the same subdivision, other thumbnail images, which constitute a second group, are distributed in such a way that when said transparency device is positioned facing said micro-image array, these thumbnail images are each disposed along the same axis, different from the optical axis of said associated micro-optical device;

the image reconstructed by the combination of the thumbnail images of each subdivision, seen from at least one predetermined angle of observation, constitutes a recognizable information or has a recognizable visual effect;

said complex transparency device and said micro-image array are carried by the same medium;

said complex transparency device and said micro-image array are carried by different media; and said two-dimensional micro-image array is generated by a display device such as a digital tool screen, whether it is mobile or not.

The invention also relates to a security document, such as a banknote, whose one of the opposite faces carries a complex transparency device of the assembly according to any of the preceding characteristics.

Advantageously:
- said complex transparency device extends above a printing carried by one of said opposite faces, this printing constituting the two-dimensional micro-image array of said assembly according to any of the preceding characteristics.
- said complex transparency device extends through a window which opens on said opposite faces and which includes a printing constituting the two-dimensional micro-image array of said assembly according to any of the preceding characteristics, this window and this printing being disposed relative to each other so that they can be superimposed at least momentarily.
- said printing consists of at least one ink chosen from the group consisting of the following inks: visible black ink, colored ink, matt ink, gloss ink, ink with iridescent effect, metallic ink, optically variable ink, invisible ink but visible under ultraviolet radiation (fluorescence or phosphorescence) or visible under infrared radiation.
- said transparency device is coated with a layer of transparent varnish, so that the upper surface of said device is planar.

BRIEF DESCRIPTION OF THE DRAWINGS

Other characteristics and advantages of the invention will become apparent upon reading the following description of a preferred embodiment of the invention. This description is made with reference to the appended drawings wherein.

Finally.

DETAILED DESCRIPTION OF THE INVENTION

According to the present invention, an assembly is formed consisting of two main elements, namely a complex transparency device which is likely to appear on a security document such as a banknote and which operates in transmission, consisting of micro-optical devices, as well as a medium that the complex transparency device is facing, by means of a simple alignment.

Preferably, this medium accommodates at the place where the complex transparency device is superimposed, patterns that cannot be interpreted with the naked eye which can be affixed directly on the substrate of the medium (made of paper and/or polymer) or be visible on the screen of a "smartphone"-type phone or of a touchpad for example, and be readable in reflection or transmission.

Alternatively, part of the patterns may be on the substrate of the medium and another part may be on the mobile appliance described above. When these two elements are superimposed correctly they allow:
- either, forming different images, for a certain number of given positions of observation (in near vision, i.e. in the vicinity of 40 cm) so as to give an illusion of relief or movement;
- or, combining images into stereoscopic vision so as to allow perceiving a color by colorimetric combination;
- or forming a second image, in an accurate position of observation, such that this second image is somehow hidden in the main image.

A decryption is therefore implemented and is due to the combination of two planes, that of an array of micro-images and that of an array of micro-optical devices which are themselves encrypted or encoded individually, i.e. whose arrangement of the smallest constituent units, the micro-images reciprocally the micro-optics, does not follow any rule of symmetry or replication (translation), which is straightaway easy to recognize by simple observation with the naked eye or assisted (magnifying glass, microscope).

Alternatively, the combination of the two planes can be fixed and made once and for all either directly on the substrate of the medium or indirectly by means of another vector itself affixed or integrated into the substrate of the medium (for example elements transferred or hot-rolled or cold-rolled, partially embedded wires, etc.).

Principle of Encoding and State of the Art Specific to the Present Invention:

The system of the assembly according to the invention resides in the combined encoding (encryption) medium+complex transparency device. It is meant by "complex transparency device" any refractive, diffractive or combined device, acting on the phase of the light (for example diffractive gratings, lenses, prisms, etc.).

Each image of the medium consists of "thumbnail images" corresponding to sub-elements of a micro-image array (ultimately, the smallest thumbnail image is the pixel of the image itself).

The principle of multiscopy is to present to the vision different images according to the inclination and to the orientation of the gaze.

The best known are the use of parallax barriers or of lenticular arrays. The present invention here draws inspiration therefrom by generalizing it.

Indeed, the assembly according to the invention consists of a two-dimensional refractive grating behind which a micro-image array is placed, each thumbnail image may be offset relative to the optical axis of the lens which is directly opposite thereto for the purposes of formation of independent images.

In the past, many achievements of this type have already been proposed. Thus, for example, according to document US2014/177008, by tilting the device, it is possible to see an image moving, movements of objects that move relative to each other or effects of relief, shapes, appearance/disappearance, zoom. For this, portions of images (each corresponding to a viewing angle) are arranged in a very particular manner under each lens.

Similarly, in document WO2015011493, a different image per viewing angle is involved (the difference being that the portions of images placed under the center of the lenses are larger than those placed on the sides, because the angle range perceived in the center of the lenses is larger).

Definitions

Throughout the present application, the following terms and expressions have the definitions given below:

Micro-optical device: it is formed of a device whose size can vary between 25 μm and 100 μm. Its focal length can vary between 10 and 400 μm and preferably between 40 μm and 100 μm.

Micro-image array: It is formed of thumbnail images whose size is greater than 2 μm and which are magnified under the effect of micro-optical devices. This accordingly allows forming a large image.

Image: the image is what is perceived when looking through an array of micro-optical devices. Its size corresponds to the size of said array, i.e. between a few square millimeters and a few square centimeters. It is formed of a set of thumbnail images (otherwise called image portions).

Thumbnail image or image portion: a thumbnail image is the smallest sub-element of the micro-image array and which will constitute an image. Its size is smaller than or equal to that of a micro-optical device. This allows having several possible thumbnail images for a given device. Thus, the thumbnail image selected by a micro-optics will be different depending on the viewing angle, which will create a different image. Between two consecutive images, the viewing angle can vary by a few degrees.

Principles Underlying the Present Invention

The first principle implemented is based on three distinct elements.

The first one concerns the nature of the refractive grating disposed above the micro-image array. By taking inspiration from the multiscopic principle, it is proposed here to combine an imaging function (lens or an axicon) with a prism-type deflection function, and this individually and independently for each element of the grating. Under these conditions, the refractive grating advantageously consists of a micro-optical device including an imaging element (a lens or an axicon) coupled to a prism (whose angle and orientation are fixed).

The second one is based on the design of the array of micro-images. The latter are disposed and designed so that placing them facing the optical element creates, at some positions of the gaze, different images.

The third one concerns the phase aliasing of the micro-optical devices. Indeed, this phase aliasing allows merging the imaging function with the prism function by transforming it into a function of translation of the axis of the imaging object relative to the optics. This aliasing simplifies the manufacture of the optics and the implementation of the second element.

The second principle, i.e. the fact that the array of micro-optical devices is not necessarily periodic, makes it more difficult to copy the array if the latter is not covered with a compensation layer, such as a varnish aiming at making the surface of the array inaccessible. If this compensation layer is not present, thanks to the invention, the arrangement of the smallest constituent units of the latter indeed cannot be deduced by simple observation.

In addition to resorting to the principle of aliasing of the considered optics, both the translations of the imaging optics (made possible by the aliasing) and respectively the thumbnail images are encoded in an apparently collectively random manner, so as to avoid the easy decryption and, consequently, to be able to reproduce it only by a hypothetical faithful copy not deduced from a simple observation.

The device making it possible to reconstruct various images at a certain number of positions of the gaze leading to a configuration of micro-optics and associated thumbnail images is therefore randomly cross-connected, which presupposes a recalculation of the deflections resulting from this cross-connection in order to preserve the conditions of the initial imagery.

The result is a distribution of the translations of the micro-optics which is no longer even and therefore much more difficult to deduce and/or reproduce.

In practice, this cross-connection is made with a maximum deflection constraint limited by the manufacturing constraint upon calculation of the phase mask. For example, in the case of a p-order Fresnel lens, the limit is reached when the phase deviation between 2 consecutive pixels of the edge of the mask (i.e. the greatest spatial frequency) is greater than $p\pi$. Beyond that, it becomes a sub-sampling.

Figure 1:
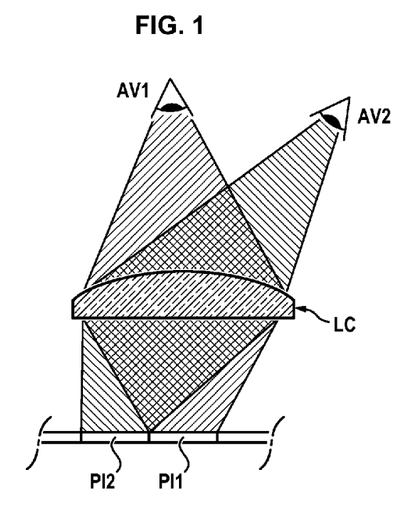
FIG. 1 is a diagram intended to illustrate the principle of multiscopy.

FIG. 1 illustrates the principle of multiscopy. Thus, a converging lens LC is involved here, so that different images for different viewing angles can be seen. For the viewing angle AV1, only the image portion PI1 is seen, since the converging lens concentrates the rays. On the other hand, for the viewing angle AV2, only the image portion PI2 will be seen. It is thus possible to have an alternation between different images.

Figure 2:
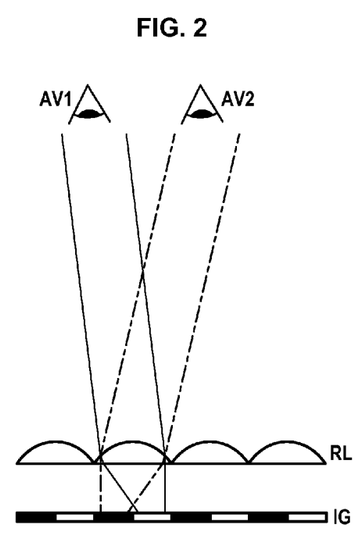
FIGS. 2 and 3 are diagrams intended to illustrate cases of auto-stereoscopy.
Figure 3:
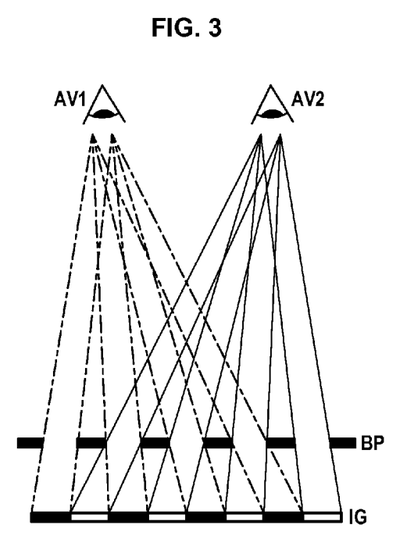

FIGS. 2 and 3 illustrate cases of use of auto-stereoscopy. Thus, with reference to FIG. 2, a lenticular array RL is involved, which as explained above, allows favoring some viewing angles AV1 and AV2, so that a thumbnail image IG portion will be visible for each eye. Under these conditions, it will look like it is a relief image. In the same way and with reference to FIG. 3, it is possible to use the parallax barriers BP which block portions of beams so that each eye can see different thumbnail images IG.

Figure 4:
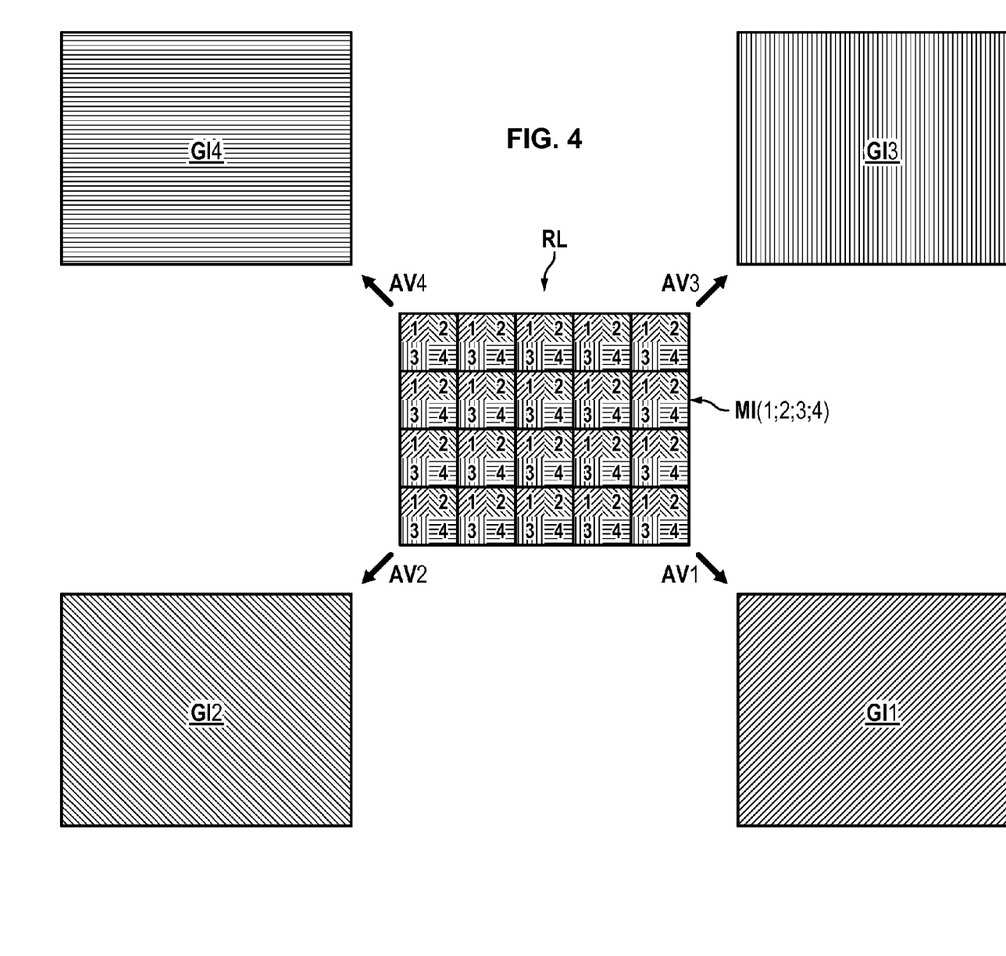
FIG. 4 is a diagram intended to explain how different images are reconstructed from micro-images that extend under a lens array.

In FIG. 4, there is a micro-image array MI1 to MI4 in the central position. Each lens of the lens array RL is delimited by a square under which extend four micro-images which are disposed so that they reconstruct a large image GI1 to GI4 for four given viewing angles AV1 to AV4.

Figure 5:
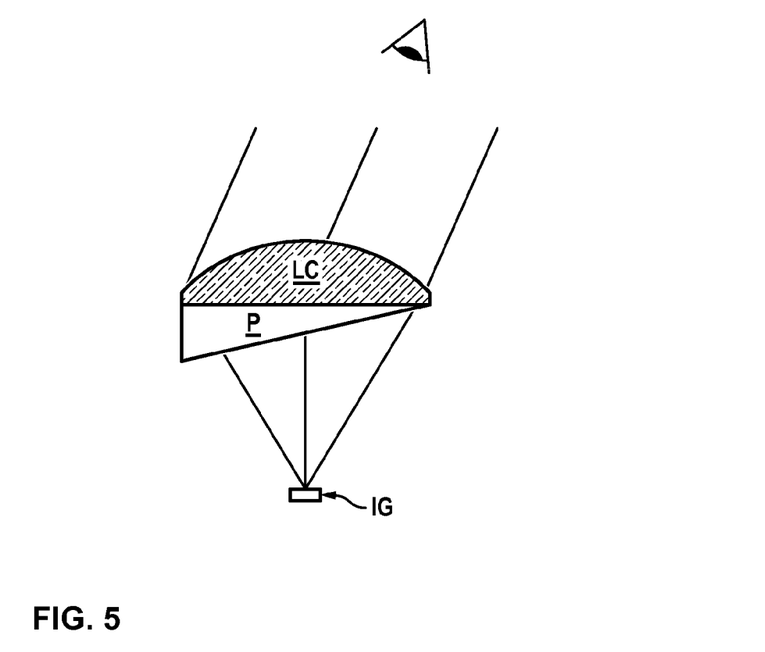
FIG. 5 is a diagram showing the equivalence between the combination of a refractive lens and of a prism on the one hand, and a Fresnel lens whose optical axis is de-centered on the other hand.

Referring to FIG. 5, there is the equivalence between the combination of a refractive lens LC (optical power) and of a prism P (deflection of the light) on the one hand, and a de-centered Fresnel lens LF on the other hand. The latter has the same effects, namely concentration and deflection of the light. The advantage is that the deflection results in a translation.

Although this is not represented in the appended figures, an axicon associated with a prism is also equivalent to a de-centered circular blazed grating ("axicon phase hologram").

Figure 6A:
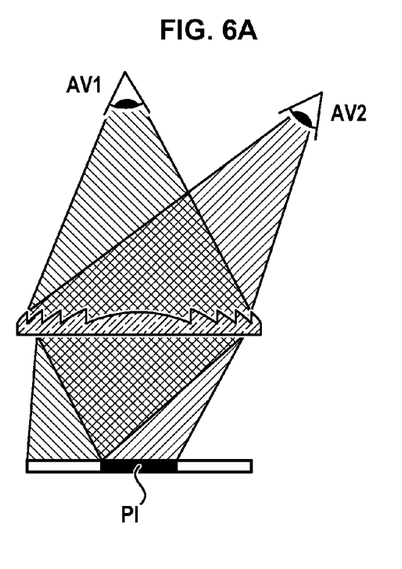
FIGS. 6A to 6D are diagrams intended to show the symmetry of the mechanisms involved, namely the de-centering of the optical axis of the lenses and the adaptation of the location of the thumbnail image (image portion)
Figure 6B:
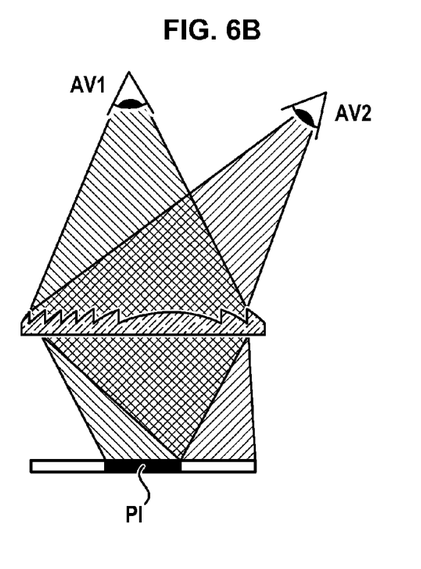

FIGS. 6A to 6D show both the effect of the de-centering of the optical axis of a lens and the adaptation of the thumbnail image (or image portion) in order to see or not the latter through the lens depending on the desired viewing angle. In the case of FIG. 6A, the image portion PI is perceived for the viewing angle AV1 when the lens is centered.

Figure 6C:
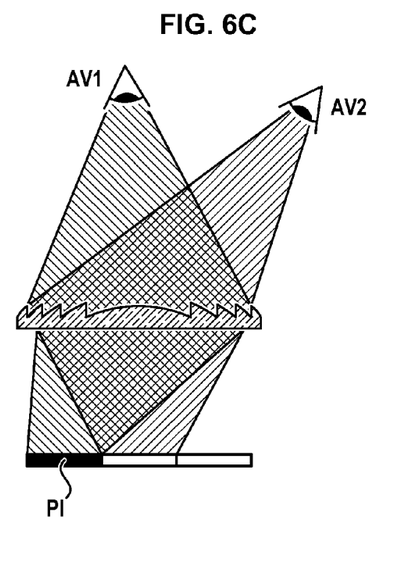
Figure 6D:
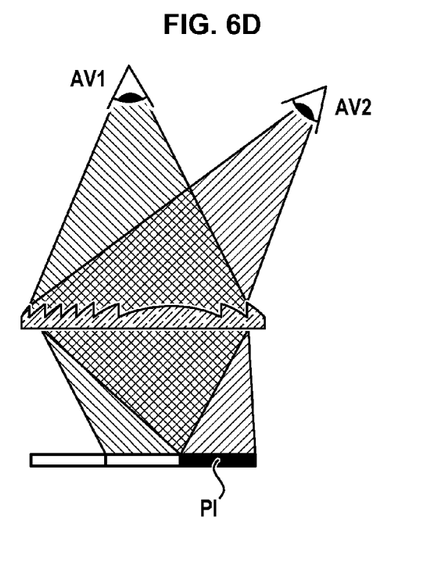

However, if the lens is de-centered towards the right, the image portion PI is then seen for the viewing angle AV2 (case of FIG. 6B), which amounts to moving the image portion PI to the left, in the case of the centered lens, as shown in FIG. 6C. in order to be equivalent to the case of FIG. 6A with a de-centered lens, it is then also necessary to move the image portion PI, as shown in FIG. 6D.

It is seen that these functionalities can be combined (i.e. interlaced) to make the extraction of the constituent parameters of the concerned arrangement more difficult.

Figure 7A:
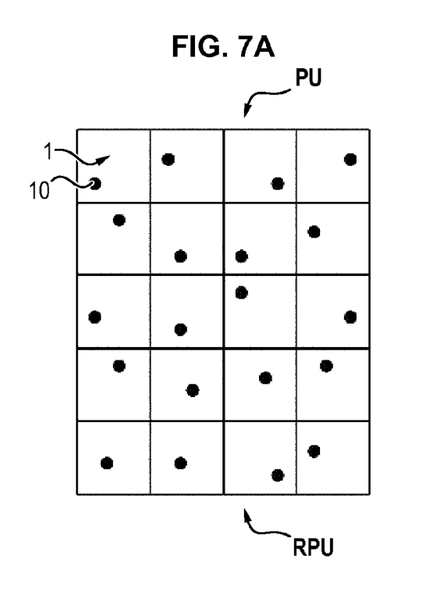
FIGS. 7A to 7C illustrate a particular embodiment of the assembly according to the invention.
Figure 7B:
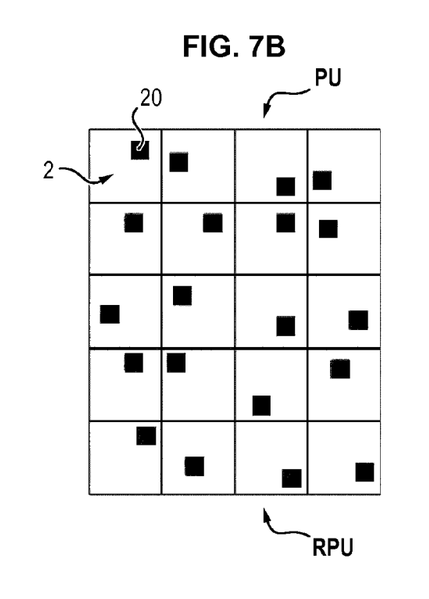
Figure 7C:
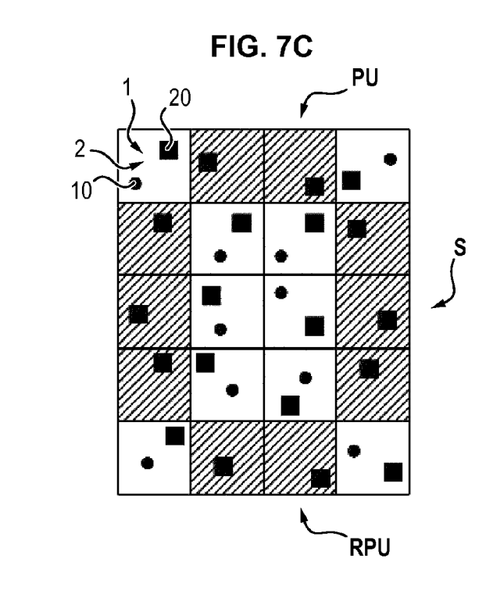

FIGS. 7A to 7C represent a particular exemplary embodiment of an assembly according to the present invention.

Thus, FIG. 7A represents a complex transparency device which consists of a two-dimensional periodic array RPU formed of individual "pupils" PU, i.e. here square-shaped locations, in which each pupil PU includes a micro-optical device. For reasons of readability of the figure, the contour of each pupil PU is represented here, but in reality it is not visible.

Still for reasons of ease of reading, this figure represents only the optical center 10 of lenses 1 placed on this array. It can be observed that these lenses have variable offsets from their optical center within the array.

In FIG. 7B, the aforementioned array RPU still appears, but now only micro-images 2 are represented, with some thumbnail images 20 represented by a black square. These thumbnail images constitute only part of the totality of the thumbnail images and constitute a "first group". It will be noted that their distribution is also non-periodic. However, the position of some of them coincides with those of the optical centers identified in FIG. 7A.

FIG. 7C represents the "final situation", i.e. the one in which the two arrays are superimposed.

At the sight of an observer, a generally "O"-shaped symbol represented in gray in the figure then appears, provided that the direction of the gaze is normal to the plane of the arrays. This "O" is an image reconstructed by the combination of the thumbnail images 20 of FIG. 7B.

And for the pixels not belonging to the symbol, the thumbnail images are far from the center of the lenses.

If the lens array of FIG. 7A or the thumbnail image array of FIG. 7B is taken separately, there is no information because their distributions both seem random and unrelated. It is only the combination of the two that shows the information constituted by the aforementioned symbol.

Although this is not represented here, a second symbol could be disclosed (or even additional symbols), provided that the thumbnail images corresponding thereto are all visible together along another axis of observation.

Thus, these thumbnail images (different from those of the aforementioned "first group") constitute a "second group" of thumbnail images.

In this way, the observer will observe the presence of the aforementioned "O" if the direction of his gaze is normal to the plane of the arrays. Then, by orienting his gaze along a different direction (or by modifying the orientation of the assembly), he will disclose the second symbol.

Finally, for all other directions, no symbol will be disclosed.

Figure 8:
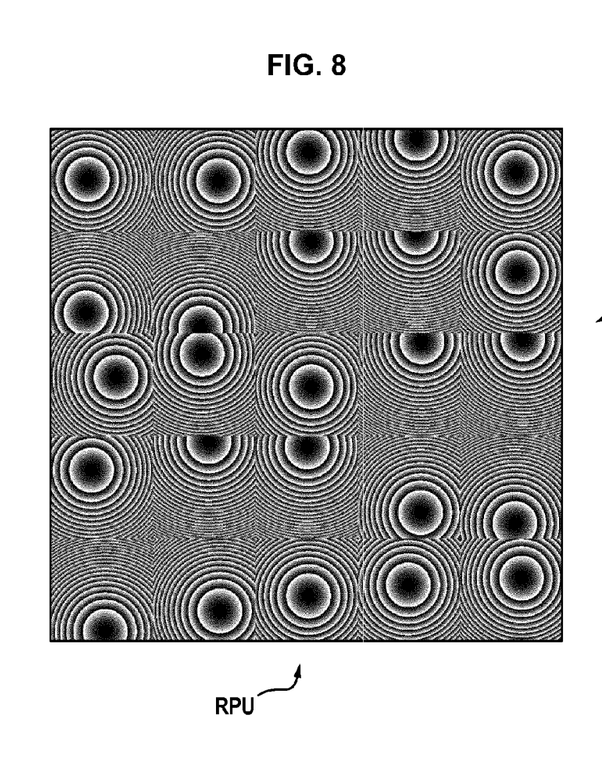
FIGS. 8 and 9 are top views of two alternative embodiments of a portion of micro-lens arrays.
Figure 9:
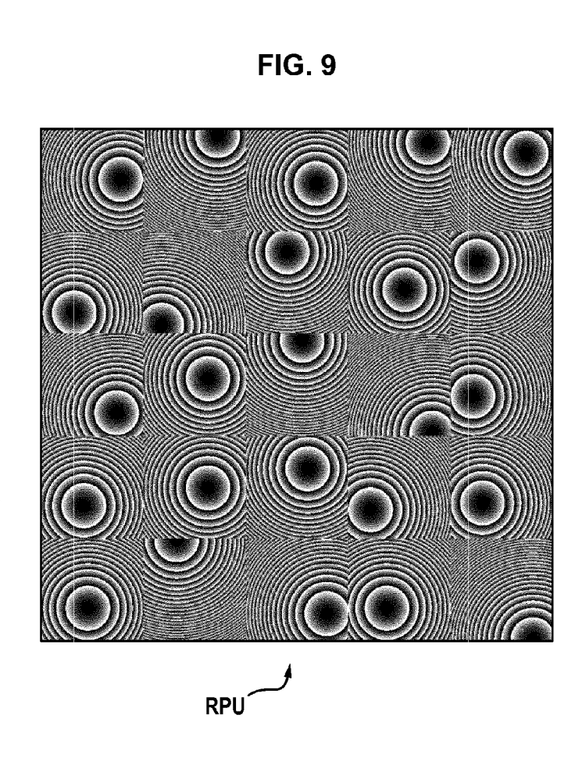

FIGS. 8 and 9 represent two micro-lens arrays 1 which have been generated independently of each other and in a random manner. For each of the micro-lenses, the micro-images placed below are adapted accordingly. Despite the difference between the two arrays, it is possible to create a combination of the lenses-thumbnail images dispositions such that exactly the same visual effect (for example, a growing square) is obtained.

It is observed that the uneven distribution of the lenses prevents reproduction other than by recopying of the particular arrangement, this arrangement can vary endlessly.

The addition of a hidden symbol in the arrays allows identifying that the pattern made is not a forgery of the original.

This symbol can be, for example, a second image only observable at a given angle (and therefore hidden for all the other angles of observation) or even, an observable pattern in reflection on the surface of the lenses and linked to their arrangement.

It may for example be a finite set of lenses whose optical axis is offset in an orderly manner in the non-periodic array to form characters or patterns. The observation of these lenses from a given angle (rather large so as not to see the thumbnail images) would allow recognizing the characters or the patterns.

Advantageously, the assembly E of the present invention is carried by a security document such as a banknote.

Figure 10:
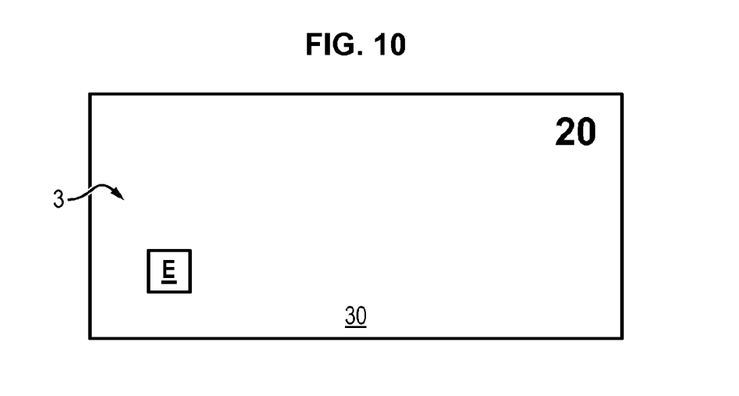
FIG. 10 is a diagram showing a banknote seen from above, and whose one of the faces carries an assembly according to the present invention.

Such a banknote 3 has been represented very schematically in FIG. 10. On one of its opposite faces, it carries said assembly E.

Figure 11A:
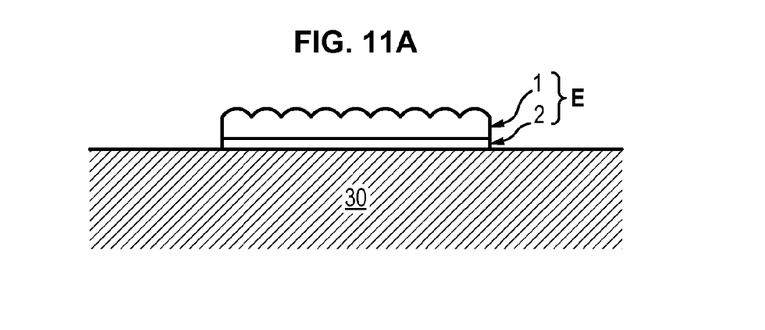
FIG. 11A is a very schematic view, in section, of the assembly of the preceding figure.

As shown more specifically in the embodiment of FIG. 11, the assembly E here consists of a lens array 1 and a micro-image array 2 carried by the face 30 of the banknote.

The assembly E can be made in this case in two steps, not necessarily consecutive, directly on the substrate of the banknote 3.

Figure 11B:
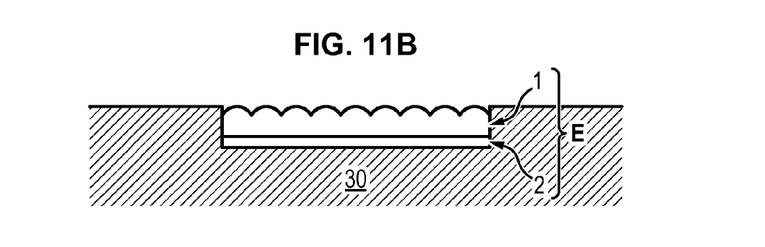
FIGS. 11B and 11C are views similar to FIG. 11A of alternative embodiments.

The assembly E can also be an insert which has become attached to the banknote 3 after an application step (for example in the form of a hot or cold transfer film, a hot or cold rolled film, etc.) or an integration step, as illustrated in FIG. 11B which shows in section a safety wire carrying the assembly E, wire inserted in the mass of the substrate but with windows making it possible to observe it with the naked eye on the surface at some places).

Figure 11C:
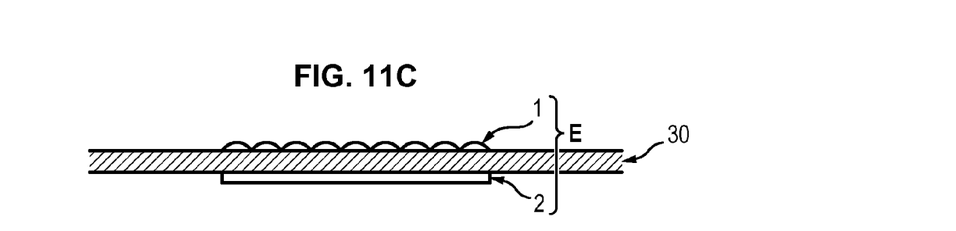

Finally, the assembly E may be passing through the substrate (as shown in FIG. 11C) constituting the banknote 3 (if it consists for example of a transparent polymer opacified in some places, except facing the array 1).

As regards the micro-image array 2, it then consists of the recognizable result of any technique making it possible to constitute, in the form of images, shapes, patterns, information, for example and without this being limiting by printing, metallization/demetallization, laser engraving.

To retain only the printing technique, the latter is carried out according to any known method making it possible to apply at least one ink chosen from the group consisting of the following inks: visible black ink, colored ink, matt ink, gloss ink, ink with iridescent effect, metallic ink, optically variable ink, invisible ink but visible under ultraviolet radiation (fluorescence or phosphorescence) or visible under infrared radiation.

Furthermore, the lens array 1 extends above the printing, either permanently or momentarily.

This lens array can for example be engraved in a first step in a photosensitive resin such as the resin S1813 (supplier Shipley) by photolithography.

The following can be made for its origination.

A resin layer is deposited on a glass substrate. The resinated plate is then exposed to a laser beam in the UV, which is modulated by a mask corresponding to the phase mask to be engraved. After development, the areas of the mask which have been exposed are removed (in the case of a "positive" resin, otherwise it is the non-exposed parts that are removed). This is how the plate is engraved in relief, the maximum engraving depth increasing with the exposure time.

From this origination, a replication process follows to obtain the tools and then the resulting finished product, i.e. the lens array 1, either directly on the banknote 3, or in a shape that can be integrated thereto (attached insert after application or integration) or even in the shape that exploits the transparency of the constituent substrate (case of the banknote made of polymeric substrate mentioned above).

Finally, there is also a variant in which this lens array 1 is removable and not attached to the banknote 3 and, in this case only, the array 2 is permanently carried by the banknote.

Preferably, the non-planar upper face of the lens array is coated with a transparent varnish, so as to make it planar and to avoid any fraudulent attempt of reproduction by direct fingerprinting.

Once manufactured, the array is applied to the printing implemented above.

Figure 12:
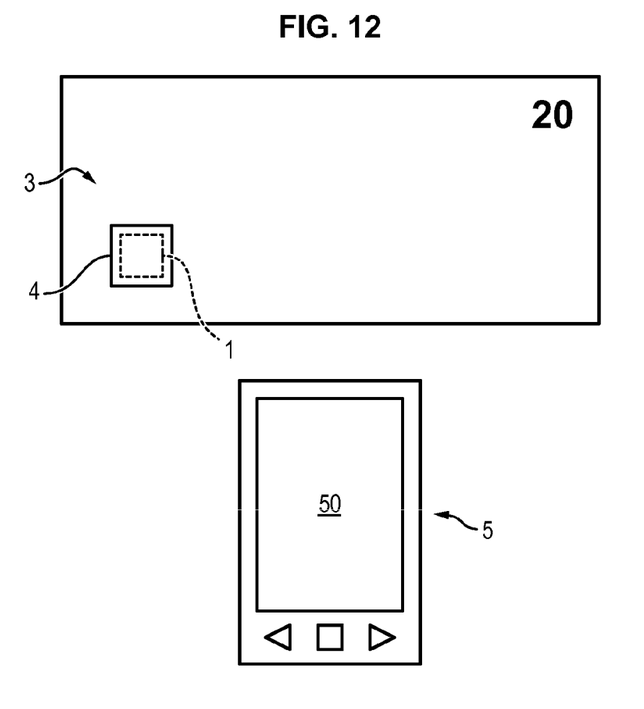
FIG. 12 is a view similar to FIG. 10, the banknote being provided with a transparent window which carries only one lens array of said assembly, this figure also showing a phone on the screen from which a micro-image array can be displayed.

In the embodiment of FIG. 12, the banknote 3 includes a window 4. This window is attached to the rest of the banknote in the case of a transparent substrate (for example banknote based on bi-oriented polypropylene). When the substrate is opaque (for example cotton fiber-based banknote), this window consists of an opening obturated by a transparent polymer material, the latter accommodating the lens array 1.

As for the micro-image array, it can be displayed on the screen 50 of a smartphone-type phone 5 or on the digital-display screen of a digital tool, whether it is mobile or not.

Thus, by opposing the window and the array displayed on the screen, it is possible to proceed to the verification of the authenticity of the banknote, depending on whether a recognizable information is disclosed or not, or on whether a recognizable visual effect is highlighted or not.

Figure 13:
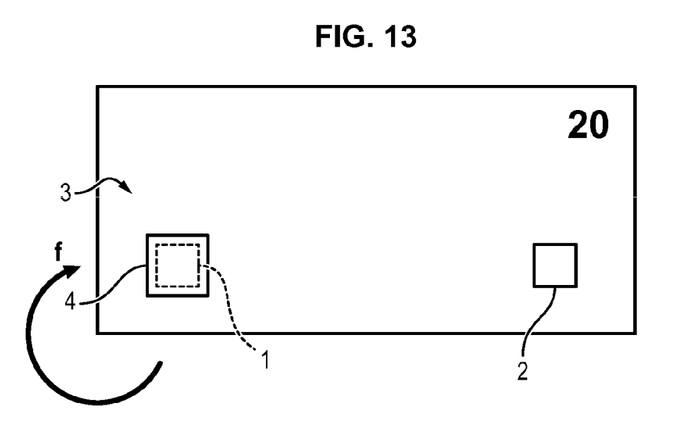
FIG. 13 represents a banknote which includes, in a first region, a transparent window which carries only one lens array of said assembly and, in a second region, a printing of a micro-image array.

In the embodiment of FIG. 13, the arrays 1 and 2 are disposed in two different regions of the banknote 3, so that by aliasing this banknote as shown by the arrow f, the two arrays can be superimposed to disclose a recognizable information or visual effect.

In one embodiment not represented, a banknote such as the one of FIG. 12 could be involved, in which the window carries, in addition to the lens array, only part (for example half) of the micro-image array, while the complementary part is displayed on the screen of a phone or the like.

Finally, in an ultimate embodiment not represented, there could be a banknote 3 that carries only the micro-image array 2 and the lens array 1 would be built on a removable medium and added only temporarily for the purposes of an authentication.

The invention claimed is:

1. An assembly comprising:
a complex transparency device having a refractive or diffractive device acting on the phase of the light and at least one micro-image array, wherein:
said complex transparency device consists of a periodic two-dimensional array formed of individual pupils in which each pupil includes a micro-optical device, wherein at least a part of the micro-optical devices have a non-centered optical axis and at least a part of the micro-optical devices are positioned non-periodically; wherein at least two different non-centered optical axes of at least two different micro-optical devices within said array have different positions within their respective pupils;
the at least one micro-image array comprising as many micro-images as there are micro-optical devices;
each micro-image has a contour identical to that of the associated pupil and a surface identical to that of the associated pupil;
each micro-image is subdivided into one or more thumbnail images, so that when said transparency device is positioned facing said micro-image array and said array is observed through said transparency device, an image reconstructed by the combination of the one or more thumbnail images associated is observable at least along a given direction of observation, and
wherein within the one or more thumbnail images, a first group of thumbnail images is distributed in such a way that when said transparency device is positioned facing said micro-image array, each thumbnail image of the first group of thumbnail images is disposed along the optical axis of an associated micro-optical device.

2. The assembly according to claim 1, wherein each of the micro-optical devices include a non-centered optical axis and all the micro-optical devices are positioned non-periodically.

3. The assembly according to claim 1, wherein said pupils are of identical shape and surface.

4. The assembly according to claim 1, wherein the micro-optical devices having a non-centered optical axis consist of Fresnel lenses.

5. The assembly according to claim 1, wherein said micro-optical devices having a non-centered optical axis consist of circular blazed gratings.

6. The assembly according to claim 1, wherein each micro-image is subdivided into at least two thumbnail images.

7. The assembly according to claim 1, wherein within the same subdivision a second group of thumbnail images is distributed in such a way that when said transparency device is positioned facing said micro-image array, each thumbnail image of the second group of thumbnail images are each disposed along the same axis, different from the optical axis of said associated micro-optical device.

8. The assembly according to claim 1, wherein the image reconstructed by the combination of the one or more thumbnail images of each subdivision, seen from at least one predetermined angle of observation, constitutes a recognizable information or has a recognizable visual effect.

9. The assembly according to claim 8, wherein said two-dimensional micro-image array is generated by a display device, whether it is mobile or not.

10. The assembly according to claim 9, wherein the display device is a digital tool screen.

11. The assembly according to claim 1, wherein said complex transparency device and said micro-image array are carried by the same medium.

12. The assembly according to claim 1, wherein said complex transparency device and said micro-image array are carried by different media.

13. An apparatus, comprising:
a first face and a second face opposite the first face, wherein at least one of the first face or second face carries a complex transparency device includes:
a periodic two-dimensional array formed of individual pupils in which each pupil includes a micro-optical device, wherein at least part of the micro-optical devices have a non-centered optical axis and at least a part of the micro-optical devices are positioned non-periodically; wherein at least two different non-centered optical axes of at least two different micro-optical devices within said array have different positions within their respective pupils;

wherein each micro-image array comprising as many micro-images as there are micro-optical devices, wherein each micro-image has a contour identical to that of the associated pupil and a surface identical to that of the associated pupil, wherein each micro-image is subdivided into one or more thumbnail images, so that when said transparency device is positioned facing said micro-image array and said array is observed through said transparency device, an image reconstructed by the combination of the one or more thumbnail images associated is observable at least along a given direction of observation, and wherein within the one or more thumbnail images, a first group of thumbnail images is distributed in such a way that when said transparency device is positioned facing said micro-image array, each thumbnail image of the first group of thumbnail images is disposed along the optical axis of an associated micro-optical device.

14. The apparatus according to claim 13, wherein the complex transparency device extends above a printing carried by the first or second face, this printing constituting the two-dimensional micro-image array.

15. The apparatus according to claim 14, wherein said printing consists of at least one ink chosen from the group consisting of the following inks: visible black ink, colored ink, matt ink, gloss ink, ink with iridescent effect, metallic ink, optically variable ink, invisible ink but visible under ultraviolet radiation (fluorescence or phosphorescence) or visible under infrared radiation.

16. The apparatus according to claim 13, wherein the complex transparency device extends through a window which opens on said opposite faces, and wherein the complex transparency device further includes a printing constituting the two-dimensional micro-image array disposed relative to each other so that they can be superimposed at least momentarily.

17. The apparatus according to claim 13, wherein said printing consists of at least one ink chosen from the group consisting of the following inks: visible black ink, colored ink, matt ink, gloss ink, ink with iridescent effect, metallic ink, optically variable ink, invisible ink but visible under ultraviolet radiation (fluorescence or phosphorescence) or visible under infrared radiation.

18. The apparatus according to claim 13, wherein the complex transparency device is coated with a layer of transparent varnish, so that the upper surface of said device is planar.

19. The apparatus according to claim 13, wherein the apparatus is a security document.

20. The apparatus according to claim 19, wherein the security document is a bank note.

* * * * *